UNITED STATES PATENT OFFICE.

RICHARD H. WINSBOROUGH, OF ST. LOUIS, MISSOURI.

IMPROVEMENT IN THE PREPARATION AND APPLICATION OF PYROXYLINE FOR DENTAL PLATES.

Specification forming part of Letters Patent No. 114,242, dated April 25, 1871.

*To all whom it may concern:*

Be it known that I, RICHARD H. WINSBOROUGH, of the city of St. Louis, in the State of Missouri, have invented certain new and useful Improvements in the Preparation and Application of Pyroxyline for Dental Purposes; and I do hereby declare the following to be a correct description of my said improvements.

My improvements relate, first, to the bleaching of the material, and, secondly, to a new mode of applying it in the manufacture of artificial gums and plates attached to artificial teeth.

The vegetable fibers of cotton, flax, and hemp used for the preparation of pyroxyline for dentists' use should be bleached both before and after their conversion into soluble pyroxyline, so that the pyroxyline manufactured from them may be more highly translucent or semi-transparent. This transparency assists materially in imparting to the material a true resemblance to the appearance of the natural gums, such as cannot be given to an opaque material. This bleaching I effect by the use of chlorine-gas, or of any other bleaching agent which will not operate to decompose the pyroxyline.

The pyroxyline which I prefer to use is that which has been dissolved in a solution of camphor, the oil extracted from camphor, or artificial camphor, mixed with one or more of the liquids, ether, alcohol, strong acetic acid, volatile or fixed oils, dilute mineral acids, or any menstruum that holds camphor in solution. I can also use pyroxyline with which camphor has been incorporated by mechanical means.

In either case the composition is to be reduced to a plastic condition prior to molding. This plastic camphorated pyroxyline is inserted in plaster or porous molds around the artificial teeth previously introduced and fixed therein, when the camphor is to be either driven out by artificial heat or natural evaporation, or extracted by the application to the molds of chemicals which will dissolve and draw out the camphor without affecting the pyroxyline.

The artificial gum or dental plate thus formed will be of one piece of pure pyroxyline, light, strong, tasteless, unaffected by saliva, and, if properly colored, a close imitation in appearance of the natural gum.

I do not claim any admixture of other substances with pyroxyline; nor do I claim any method of rendering pyroxyline plastic, or of molding it in solid or non-porous flasks; but What I do claim is—

1. Pyroxyline for dental purposes, bleached by the application of chlorine or other suitable bleaching agent, in order to render it more highly translucent or semi-transparent, as and for the purpose set forth.

2. Artificial gums or dental plates formed by the introduction of plastic camphorated pyroxyline into plaster or porous molds, and, while said material remains in the molds, expelling the camphor or other solvent by artificial heat or natural evaporation, or extracting it by chemical means, as specified.

RICHARD H. WINSBOROUGH.

Witnesses:
　N. W. LITTELL,
　JNO. C. SPILLER.